Patented Aug. 5, 1924.

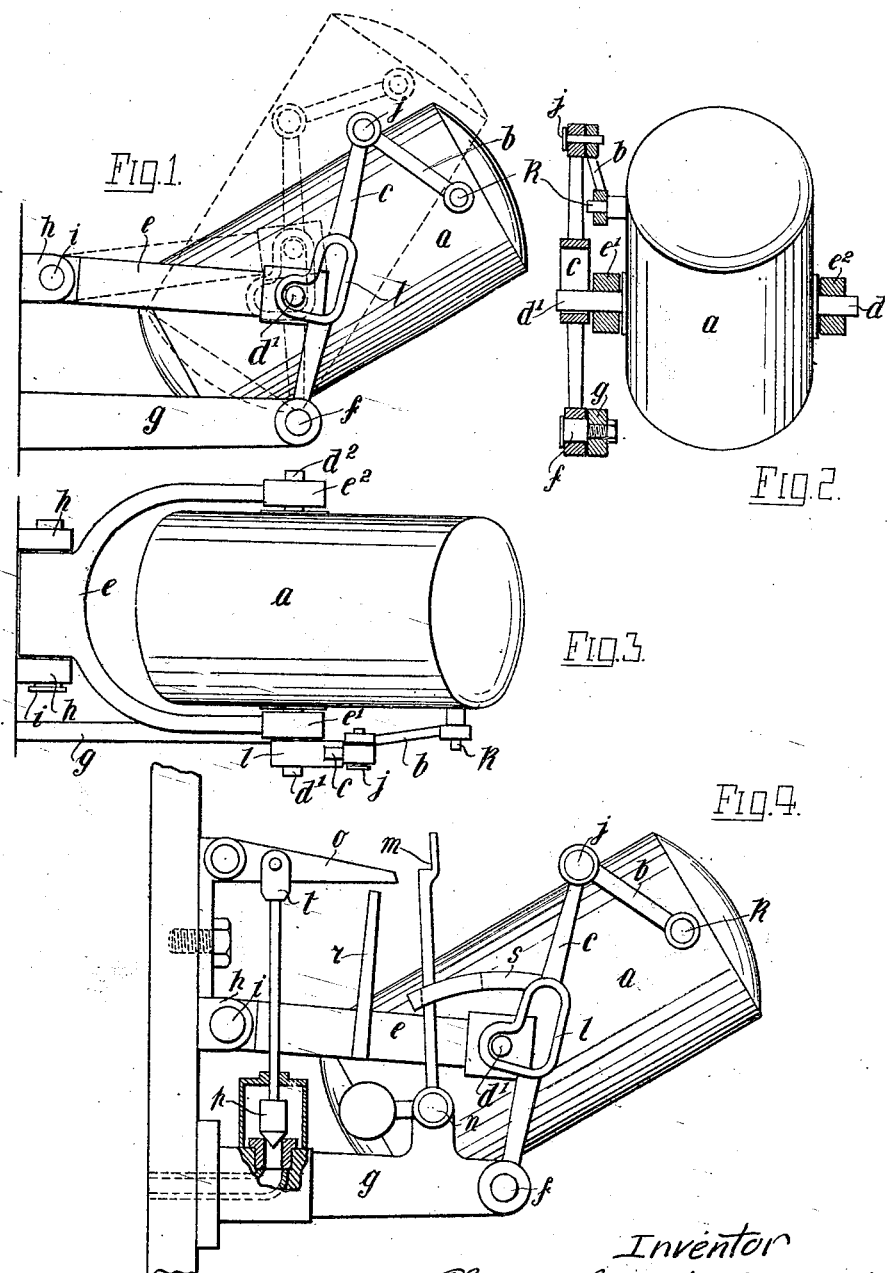

1,503,734

UNITED STATES PATENT OFFICE.

CHARLES HINLEY WILKINSON, OF HULL, ENGLAND.

FLOAT-OPERATED VALVE OR COCK.

Application filed November 22, 1923. Serial No. 676,328.

*To all whom it may concern:*

Be it known that I, CHARLES HINLEY WILKINSON, a subject of the King of Great Britain, residing at 13 Torrington Street, Newland Avenue, Hull, England, have invented certain new and useful Improvements in or Relating to Float-Operated Valves or Cocks, of which the following is a specification.

This invention relates to float-operated valves or cocks and has for its object to provide such devices which will cause and impart periodically quick and definite movements, to open and close valves or cocks such as used in steam traps and the like, for the periodical discharge of a liquid.

According to the invention, a float at the surface of a liquid is mounted and held by suitable means against upward movement due to the rise of the liquid, in an extreme lower position until the buoyant forces are sufficient and their point of application with respect to the retaining means, such that, the float suddenly is caused to rise to its extreme upper position and in rising is caused to open a discharge valve. The float remains in its extreme upper position until, it can actually float on the falling liquid and when the liquid has fallen sufficient, the mounting of the float is such that the float is caused to move suddenly with respect thereto which movement closes the discharge valve and brings the parts into position to repeat the cycle of operations.

And in order that my invention may be better understood, I will now proceed to describe the same with reference to the accompanying drawing, in which:—

Fig. 1 is a side elevation of the float and float mounting mechanism.

Fig. 2 is a front elevation of Fig. 1, partly in section.

Fig. 3 is a plan of Fig. 1.

Fig. 4 is a similar view to Fig. 1, but having combined therewith the discharge valve and operating mechanism therefor.

In the drawings $a$ is a hollow and sealed float of copper or other suitable material of cylindrical shape having stub axles $d^1$ and $d^2$ securely fixed at diametrically opposite points thereon a certain desired distance from the longitudinal centre $h$ are brackets secured to the containing vessel having hinged or pivoted thereon a forked arm or lever $e$ in the outer ends $e^1$ and $e^2$ of which the axles $d^1$ and $d^2$ are mounted so as to be free to turn thereon. $g$ is a rigid bracket secured to the containing vessel having a screw pivot pin $f$ at the end thereof on which is mounted a control lever $c$ adapted to turn on the pivot $f$. The upper end of the lever $c$ has connected thereto by a pivot pin $j$ a link $b$ the other end of which takes over a pin $k$ securely fixed to the float $a$.

Intermediate the length of the lever $c$ a guiding slot $l$ is formed into which the extending outer end of the stub axle $d^1$ projects.

As will be seen in Fig. 4, the bracket $g$ also supports another screwed pivot pin $n$ upon which is mounted a weighted gravity pawl $m$ and the brackets $h$ are extended upwards to form a support for the pivot pin $u$ of a valve lever $o$, the outer end of which extends towards the pawl $m$ and is capable of being engaged thereby in the upper position of the valve. $p$ is a discharge valve connected by a stem to the joint $t$ pivoted to the lever $o$. $r$ is a rigid projection on the side of the float lever $e$, the upper end of which when the float rises is adapted to lift the free end of the lever $o$. $s$ is a rigid projection from the lever $c$ engaging and controlling the pawl $m$ through a lost motion engagement.

It is preferred to make the float of light gauge sheet copper for example 20 or 22 gauge, with brazed joints and to make the other portions of the device of phosphor bronze castings with the exception of the pivot pins which preferably would be of mild steel. Other metals may be used either as castings or forgings, according to the size of apparatus constructed.

The action and movement of the float during immersion in a liquid is as follows:—

When the liquid rises up the lower portion of the float, below the axles $d^1$, $d^2$, an upward pressure is exerted tending to rotate the float axles $d^1$, $d^2$. This pressure is converted to a force acting downwards at $k$, by reason of float $a$, acting as a lever, with fulcrum $d^1$ in guide frame $l$. This force acting through link rod $b$, control lever $c$, guide frame $l$, on axle $d^1$, prevents any movement of the float, until the liquid has reached a certain height on the upper portion of the float, above axles $d^1$, $d^2$. The liquid then exerts a greater pressure on the upper portion than on the lower portion of the float, due to the axles $d^1$, $d^2$, being out of centre longitudinally. This difference of pressure and by reason of the float acting as a lever, with fulcrum $d^1$ in guide frame $l$, causes the float to partly rotate, and thrust the control lever $c$ over, thus liberating axle $d^1$, in guide frame $l$ and allows the float to ascend, at a moment when the upward pressure on the float is near the maximum, thus providing a powerful movement, suitable for opening a valve or cock.

The descent of the float does not commence, until the liquid has receded to a level, at which the weight of float $a$, and float lever $e$ are equal to the displacement of the liquid. The float then descends with the liquid, and when axle $d^1$ enters the recess in guide frame $l$, the float rotates quickly on axles $d^1$, $d^2$ to its former position, due to the upward pressure on the lower portion of float, thus providing a quick, effective movement, for closing a valve or cock.

The opening of the discharge valve $p$, is effected by a movement, imparted by and during the ascent of float $a$, by means of the rigid projection $r$ which thrusts upwards the valve lever $o$, metal rod and joint $t$, and discharge valve $p$. The discharge valve $p$ is held open during the descent of float $a$ by means of the gravity pawl $m$, which engages and supports the valve lever $o$, metal rod and joint $t$, and discharge valve $p$.

The closing of the discharge valve $p$ is effected during the moment, when axle $d^1$ enters the recess in guide frame $l$, and is caused by the movement of float $a$, which is imparted to the gravity pawl $m$, by means of the link $b$, control lever $c$ and the rigid projection $s$ which engages and withdraws the gravity pawl $m$, from the valve lever $o$, and allows the discharge valve $p$ to close by the force of gravity.

What I claim as my invention and desire to secure by Letters Patent of the United States of America is:—

1. An inclined cylindrical float, for actuating valves or cocks, having stub axles fixed at diametrically opposite points and at a desired distance from the longitudinal centre of the float, the said stub axles being pivotally mounted in the free ends of the arms of a forked lever pivoted to a fixed support, a control lever pivoted to a fixed support and furnished with a guide slot into which an extension of one of the stub axles projects and a link pivoted to the free end of the control lever and a projecting pin on the float, for the purposes set forth.

2. An inclined cylindrical float, for actuating valves or cocks, having stub axles fixed at diametrically opposite points and at a desired distance from the longitudinal centre of the float, the said stub axles being pivotally mounted in the free ends of the arms of a forked lever pivoted to a fixed support, a control lever pivoted to a fixed support and furnished with a guide slot into which an extension of one of the stub axles projects, a link pivoted to the free end of the control lever and a projecting pin on the float, and a discharge valve adapted to be opened on the ascent of the float and closed at a desired period of the descent thereof, for the purposes set forth.

3. An inclined cylindrical float, for actuating valves or cocks, having stub axles fixed at diametrically opposite points and at a desired distance from the longitudinal centre of the float, the said stub axles being pivotally mounted in the free ends of the arms of a forked lever pivoted to a fixed support, a control lever pivoted to a fixed support and furnished with a guide slot into which an extension of one of the stub axles projects, a link pivoted to the free end of the control lever and a projecting pin on the float, a projection on the forked lever, a pivoted lever connected to a discharge valve, and arranged above the upper end of the projection on the forked lever, the rise of the float causing the projection to raise the lever and open the discharge valve and means controlled by the float for retaining the valve for a period in the open position, for the purposes set forth.

4. An inclined cylindrical float, for actuating valves or cocks, having stub axles fixed at diametrically opposite points and at a desired distance from the longitudinal centre of the float, the said stub axles being pivotally mounted in the free ends of the arms of a forked lever pivoted to a fixed support, a control lever pivoted to a fixed support, and furnished with a guide slot into which an extension of one of the stub axles projects a link pivoted to the free end of the control lever and a projecting pin on the float, a projection on the forked lever, a pivoted lever connected to a discharge valve, and arranged above the upper end of the projection on the forked lever, the rise of the float causing the projection to raise the lever and open the discharge valve, a gravity pawl adapted to come beneath the end of the pivoted lever connected to the discharge valve, on the rise of the float and a projection on the control lever engaging the gravity pawl by a lost motion engagement, adapted to remove the gravity pawl from engagement with the valve lever at a definite point in the descent of the float, to close the valve, for the purposes set forth.

In witness whereof I affix my signature.

CHARLES HINLEY WILKINSON.